3,413,126
METHOD OF TREATING A MEAT EMULSION TO PRODUCE A DESIRED COLOR THEREIN

Jerome A. Meusel and Ralph A. Brunn, Baltimore, Md., assignors to The Baltimore Spice Company, Baltimore, Md., a corporation of Maryland
No Drawing. Filed Apr. 14, 1965, Ser. No. 447,975
4 Claims. (Cl. 99—109)

ABSTRACT OF THE DISCLOSURE

The use of fumaric acid to assist in the coloring of meat emulsions, particularly in the preparation of products such as frankfurters, said color being developed within a much shorter time than the normal heating time common in the art.

---

This invention relates to the use of fumaric acid in meat products. More particularly, it relates to the use of fumaric acid in the coloring of meat emulsions, such as are utilized in the preparation of frankfurters.

It is already known that a stable and attractive color may be developed in meat products prepared from meat emulsions, by suitably controlling the pH of the materials being processed so that emulsification is effected at a pH between 6.0 and 6.2 and color development is achieved at a pH between 5.5 and 5.8. The use of glucono delta lactone for this purpose is described in Sair's United States Patents 2,992,115; 2,992,116 and 3,122,442.

As indicated in the results reported in the patents the color of the finished meat product depends partly on the amount of acid generated by hydrolysis of the lactone after emulsification has been completed, and partly on the several ingredients added to the processed meat.

A very desirable color for the meat is the normal bright red smokehouse color which consumers have been trained to accept over the years.

As stated in the Sair patents "edible acids have not been commercially employed in processing cured meat compositions to be emulsified even though its contribution to color and stability of color may be beneficial," presumably because the presence of such acids in the meat being emulsified interferes with the proper emulsification of the meat even though the presence of such acids in the meat after emulsification does not appear to detrimentally affect the emulsion, but instead is believed to be beneficial.

A principal object of this invention is to develop a stable and attractive color in meat products prepared from meat emulsions, such as frankfurters, by the use of fumaric acid in amounts sufficient to provide a desired color in the finished meat product but not sufficient to interfere with the emulsification of the meat being processed, said color being developed within a much shorter than normal heating time.

Still another object of the invention is to provide an edible acid or mixture of edible acids to meat in process, for the purpose of enhancing the color and color stability of a meat emulsion containing such acid or acids.

A further object of the invention is to improve the color of meat emulsions containing seasonings such as are commonly used in sausage and other encased meat products without adversely affecting the flavor of the seasonings in said products.

These and other objects of the invention will become apparent from the description which follows in which prefered embodiments of the invention have been set forth.

Briefly the present invention comprises the introduction of fumaric acid either alone or together with ascorbic or erythorbic acid into meat being emulsified in the manufacture of such products as frankfurters.

When used alone, between ¼ and 2 ounces of fumaric acid per 100 pounds of emulsion have been found to be sufficient for the rapid development of the desired full red color.

To demonstrate the effectiveness of this additive after initial laboratory tests were run, a commercial run was made under the supervision of an inspector from the Meat Inspection Division of the United States Department of Agriculture.

A typical frankfurter emulsion was made consisting of:

| | |
|---|---|
| Fresh cow meat | 155 lbs. |
| Frozen cow meat | 90 lbs. |
| Shoulder neck fat | 150 lbs. |
| Blade shoulder | 55 lbs. |
| Fat plate beef | 150 lbs. |
| Rework meat | 25 lbs. |
| Corn syrup | 12 lbs. |
| Ice | 125 lbs. |
| Sodium nitrate | 2 ozs. |
| Seasoning | 5 lbs. 8 ozs. |
| Salt | 3 lbs. |
| Ground mustard | 6 lbs. |
| Nitrite cure (6%) | 1 lb. |
| Nonfat dry milk powder | 12 lbs. |
| Total | 789 lbs. 10 ozs. |

Chopping time was 4 minutes at a starting temperature of 53° F. with the emulsion finishing at 67° F.

The emulsion was then weighed into two equal parts and to one part was added 10 ounces of powdered fumaric acid, which was mixed in by running the chopper two additional turns.

It required approximately 1 hour to transfer from the chopper, stuff into cellophane casings, link and hang on smoking trees. Following this, both lots were allowed to temper in a room maintained at 90° F. for a period of one hour, at which time the internal temperature of the frankfurters was 90° F. This tempering procedure is a commonly accepted practice.

Both lots were then put into smoke houses. The lot without fumaric acid was subjected to the usual smoke house schedule required to develop a satisfactory, uniform color. Typically, this is started at about 140° F. and gradually raising the temperature through a period of from 90 to 120 minutes to obtain a final smoke house temperature of about 180° F. and an internal frankfurter temperature of about 160° F. This schedule reflects the accepted opinion that a too rapid increase in temperature apparently sets the protein in the meat emulsion before the curing ingredients have had time to develop color under the normal pH. In any case, a slow increase in temperature is usually required to produce a satisfactory product.

The lot with fumaric acid was put into a smoke house maintained at 200° F. At the end of 25 minutes the color of the frankfurters was fully developed and the texture comparable to the finished frankfurter made with the other half of the emulsion according to the previous smoking schedule described. The internal temperature of the frankfurters at this time was 138° F. The frankfurters were allowed to remain in the smoke house for an additional five minutes, during which time the internal temperature rose to 148° F. The texture remained the same and there was no noticeable increase in color. To see if there was going to be any further change in color or texture the frankfurters were then put into a hot water bath and raised to an internal temperature of 160° F. over a period of 15 minutes. There was no change in color or texture.

A comparison was made between the lot of frankfurters smoked according to the conventional method and the lot smoked at the high temperature with the fumaric acid and they were indistinguishable in regard to color, texture and peeling characteristics. The slight acidification caused by the addition of fumaric acid was barely noticeable as a tang which some tasters preferred.

Previous tests indicated that it was necessary to coat the fumaric acid with a material which would not allow the fumaric acid to alter the pH of the meat emulsion until the temperature was somewhat elevated above chopping temperatures, and as described in United States Patent application Ser. No. 427,465, filed Jan. 22, 1965, now Patent No. 3,359,120.

However, it now appears that for various meat emulsion formulas having, perhaps, different compositions and degrees of pH, a choice of either coated or uncoated fumaric acid can be made.

It will be seen that when between ¼ and 2 ounces of fumaric acid are incorporated per 100 pounds of meat emulsion, the desired red color and color stability are achieved in each instance without the necessity of encapsulating the acid as described in our earlier filed patent application Ser. No. 427,465, filed Jan. 22, 1965. This phenomenon appears to be peculiar to fumaric acid, possibly because it is less soluble at the low temperatures used in meat emulsification than the other edible acids identified in that application; the solubility being 0.63 gram in 100 grams of water at 25° C., 1.07 grams in 100 grams water at 40° C., 2.4 grams in 100 grams water at 60° C. and 9.8 grams in 100 grams water 100° C. But whatever the reason, it has been found that it is not necessary to coat the solid particles of acid as described in our earlier application, when fumaric acid is the acid being incorporated in the meat emulsion.

Having now described a preferred embodiment of this invention it is not intended that it be limited except as may be required by the appended claims.

What is claimed is:

1. The method of treating meat emulsion to produce a desired color therein which consists of incorporating into meat solid particles of fumaric acid, the amount of fumaric acid being between 0.25 and 2 ounces per 100 pounds of meat, the particles of fumaric acid being free from any extraneous coating, emulsifying said meat containing said fumaric acid particles, and then smoking the emulsified meat product whereby the meat emulsion attains a desired color more rapidly during smoking than an otherwise similar meat emulsion to which fumaric acid has not been added.

2. The method of claim 1 wherein the meat being emulsified contains a nitrite cure.

3. The method of claim 1 wherein the resulting emulsified meat is stuffed in casings and then cured in the presence of said added fumaric acid.

4. The method of claim 3 wherein the presence of fumaric acid causes the development of a red color to occur at lower temperatures and in a shorter time during the cure than it would develop in the absence of fumaric acid in otherwise identical emulsified meat compositions.

References Cited

UNITED STATES PATENTS

| | | | |
|---|---|---|---|
| 2,491,646 | 12/1949 | Coleman et al. | 99—157 X |
| 2,797,998 | 7/1957 | Praizler | 99—159 |
| 2,844,478 | 7/1958 | Hanley et al. | |
| 2,852,392 | 9/1958 | Huber et al. | 99—159 X |
| 3,032,421 | 5/1962 | Buchholz | 99—159 X |
| 3,052,560 | 9/1962 | Delaney | 99—159 X |
| 3,245,808 | 4/1966 | Farkas et al. | 99—159 X |
| 3,250,624 | 5/1966 | Van Ness | 99—78 |

OTHER REFERENCES

Rose et al., "The Condensed Chemical Dictionary," 1956, 5th edition, published by Reinhold Publishing Corporation, New York, p. 504, article entitled Fumaric Acid, copy in Group 172, U. S. Pat. Off.

HYMAN LORD, *Primary Examiner.*